E. A. HEWITT.
CHURNS.
No. 183,849. Patented Oct. 31, 1876.
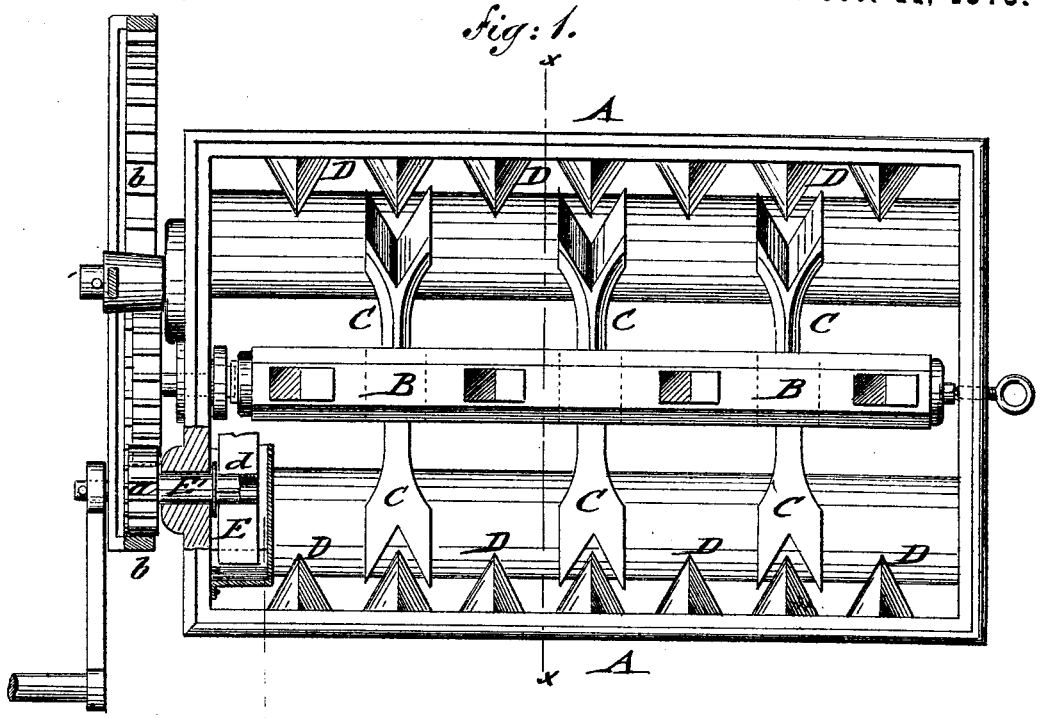
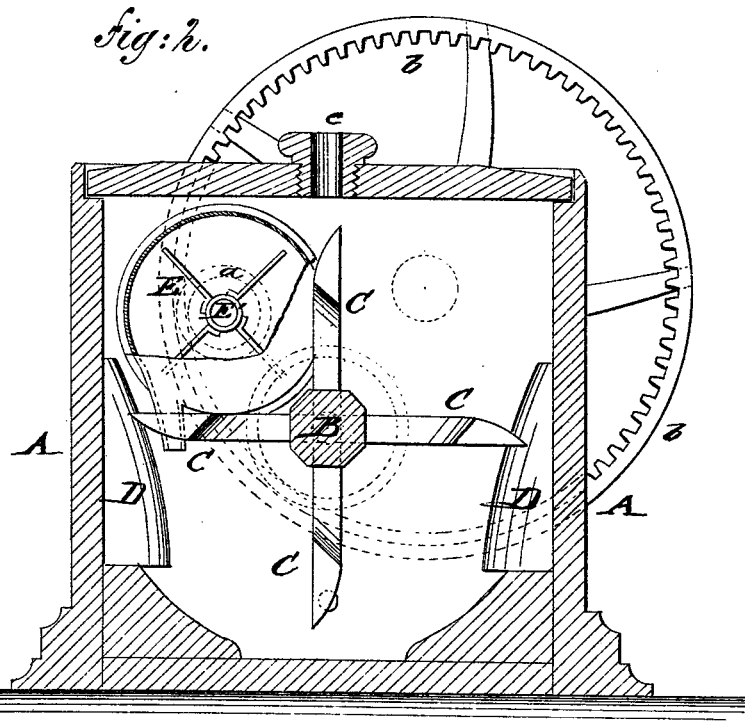
WITNESSES:
Chas Nider
John Goethals
INVENTOR:
E. A. Hewitt
BY Munn & Co.
ATTORNEYS.

UNITED STATES PATENT OFFICE.

ELISHA A. HEWITT, OF GROTON, CONNECTICUT.

IMPROVEMENT IN CHURNS.

Specification forming part of Letters Patent No. 183,849, dated October 31, 1876; application filed May 27, 1876.

*To all whom it may concern:*

Be it known that I, ELISHA A. HEWITT, of Groton, in the county of New London and State of Connecticut, have invented a new and Improved Churn, of which the following is a specification:

In the accompanying drawing, Figure 1 represents a top view of my improved churn; and Fig. 2, a vertical transverse section of the same on line $x\ x$, Fig. 1.

Similar letters of reference indicate corresponding parts.

The invention has reference to a churn of improved construction, in which the cream is cut up in rapid and effective manner under admission of a suitable quantity of air; and the invention consists of a churn with revolving bifurcated beaters and fixed side breakers, the air being admitted by a revolving fan with hollow shaft, operated by the driving mechanism.

In the drawing, A represents a churn of oblong shape, which is provided with a longitudinal shaft, B, that is revolved by suitable gear-wheel mechanism. The revolving shaft B is provided with a number of radial arms or beaters, C, which are alternately arranged at right angles to the adjoining ones, being made with bifurcated ends, flat at one side, and with sharp edges or ridges at the other side. When the shaft is revolved so that the ridges beat on the cream, the same is cut up in connection with stationary breakers D, arranged at both sides of the churn. When the shaft is turned in opposite direction, the beaters act with their flat side on the cream, and serve to gather the same at the bottom of the churn. The breakers D are made of triangular shape, tapering from the bottom toward the top, the front edges being arranged to fit between the bifurcated beaters. The number of breakers is equal to the number of beaters, one-half being arranged at each side of the churn. The bottom of the churn is made concave or dishing, for the gathering of the cream and more effective action of the beaters thereon. The air is introduced to the inside of the churn by means of a fan arrangement, E, with hollow shaft E'. The shaft E' is revolved by an outer pinion, $a$, gearing with the driving crank-wheel $b$. The air issues through the recesses or perforations $d$, at the inner end of shaft E', to the wings of fan E, and is forced through the spout of the fan-casing to the lower part of the churn, to accelerate the action of the same. The lid is provided in the knob or other place with an exit-opening, $e$, for the passage of the air.

The beaters and breakers may be readily cleaned, and exert a quick and powerful breaking action on the cream, so as to produce the butter in a short time.

Having thus described my invention, I claim as new and desire to secure by Letters Patent—

1. The combination, with the churn-body, of the rotary beaters C, having wedge-shaped concavities in the ends, and the stationary breakers D, convexed in a corresponding wedge shape, substantially as shown and described.

2. The fan E, having hollow shaft E', and spout of its case extended down toward bottom of churn, substantially as and for the purpose specified.

3. In a churn, a revolving shaft with radial beaters, having bifurcated ends, raised ridges at one side, and a flat or straight surface at the other side, substantially as set forth.

ELISHA A. HEWITT.

Witnesses:
PAUL GOEPEL,
T. B. MOSHER.